United States Patent
Wang et al.

(10) Patent No.: US 11,233,849 B2
(45) Date of Patent: Jan. 25, 2022

(54) MESSAGE TRANSMISSION METHODS AND APPARATUSES

(71) Applicant: ALIPAY (HANGZHOU) INFORMATION TECHNOLOGY CO., LTD., Zhejiang (CN)

(72) Inventors: Jiang Wang, Hangzhou (CN); Chao Zeng, Hangzhou (CN); He Sun, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,940

(22) Filed: Jun. 29, 2021

(65) Prior Publication Data

US 2021/0329066 A1    Oct. 21, 2021

(30) Foreign Application Priority Data

Sep. 25, 2020  (CN) .......................... 202011021693.4

(51) Int. Cl.
*G06F 15/16*      (2006.01)
*G06F 9/54*       (2006.01)
(Continued)

(52) U.S. Cl.
CPC ........ *H04L 67/108* (2013.01); *H04L 67/1053* (2013.01); *H04L 67/1059* (2013.01); *H04L 67/1065* (2013.01)

(58) Field of Classification Search
CPC .................................................. H04L 67/108
(Continued)

(56) References Cited

U.S. PATENT DOCUMENTS 10,417,217 B2   9/2019  Pierce et al.
10,659,434 B1 *  5/2020  Kim ..................... H04L 63/0236
(Continued)

FOREIGN PATENT DOCUMENTS

CN    1599350       3/2005
CN    102769889     11/2012
(Continued)

OTHER PUBLICATIONS bitcoinfibre.org [online], "FIBRE," available no later than Jul. 2016, retrieved on Aug. 24, 2021, retrieved from URL<https://bitcoinfibre.org/>, 4 pages.
(Continued)

*Primary Examiner* — Hamza N Algibhah
(74) *Attorney, Agent, or Firm* — Fish & Richardson P.C.

(57) ABSTRACT

One or more embodiments of this specification provide message transmission methods and apparatuses. A method includes: registering each of a plurality of blockchain nodes in a blockchain relay communication network to a blockchain node set indicated in a registration request submitted by a corresponding blockchain node of the plurality of blockchain nodes; generating a routing policy corresponding to each of the plurality of blockchain nodes, the routing policy comprising a blockchain node set that the corresponding blockchain node belongs and a relay node that connects to the corresponding blockchain node; receiving a blockchain message for a target blockchain node in a target blockchain node set; determining a target relay node connected to the target blockchain node according to a tree-structured routing table obtained by organizing routing policies in a tree structure; and transmitting the blockchain message to the target blockchain node.

20 Claims, 8 Drawing Sheets

(51) Int. Cl.
*H04L 29/06* (2006.01)
*H04L 29/08* (2006.01)

(58) Field of Classification Search
USPC .................................................. 709/203
See application file for complete search history.

(56) References Cited

U.S. PATENT DOCUMENTS

| | | | |
|---|---|---|---|
| 10,659,462 B1* | 5/2020 | Kim | H04L 63/0209 |
| 10,757,084 B1 | 8/2020 | Yu | |
| 2014/0022902 A1 | 1/2014 | Uppunda et al. | |
| 2017/0352027 A1 | 12/2017 | Zhang et al. | |
| 2018/0212970 A1 | 7/2018 | Chen et al. | |
| 2019/0081796 A1* | 3/2019 | Chow | H04L 9/30 |
| 2019/0082007 A1 | 3/2019 | Klarman et al. | |
| 2020/0177572 A1 | 6/2020 | Qui | |
| 2020/0294016 A1* | 9/2020 | Jiang | H04L 9/32 |
| 2020/0341951 A1* | 10/2020 | Oberhofer | H04L 63/0428 |
| 2021/0099422 A1* | 4/2021 | Suzuki | H04L 9/3247 |
| 2021/0152358 A1* | 5/2021 | Joseph | H04L 9/3213 |
| 2021/0160077 A1* | 5/2021 | Destefanis | H04L 9/3236 |
| 2021/0160171 A1* | 5/2021 | Liu | H04L 9/3247 |

FOREIGN PATENT DOCUMENTS

| | | |
|---|---|---|
| CN | 103533569 | 1/2014 |
| CN | 103916423 | 7/2014 |
| CN | 104753980 | 7/2015 |
| CN | 105306232 | 2/2016 |
| CN | 107231299 | 10/2017 |
| CN | 107800795 | 3/2018 |
| CN | 107846718 | 3/2018 |
| CN | 108829749 | 11/2018 |
| CN | 109039847 | 12/2018 |
| CN | 109635165 | 4/2019 |
| CN | 109639550 | 4/2019 |
| CN | 109784881 | 5/2019 |
| CN | 109996306 | 7/2019 |
| CN | 110445882 | 11/2019 |
| CN | 110474846 | 11/2019 |
| CN | 110602201 | 12/2019 |
| CN | 110650189 | 1/2020 |
| CN | 110737664 | 1/2020 |
| CN | 110741400 | 1/2020 |
| CN | 110751475 | 2/2020 |
| CN | 110855565 | 2/2020 |
| CN | 111066286 | 4/2020 |
| CN | 111132258 | 5/2020 |
| CN | 111245745 | 6/2020 |
| CN | 111277549 | 6/2020 |
| CN | 111277562 | 6/2020 |
| CN | 111353175 | 6/2020 |
| CN | 111447290 | 7/2020 |
| CN | 111522833 | 8/2020 |
| KR | 20180129028 | 12/2018 |
| WO | WO2018231255 | 12/2018 |

OTHER PUBLICATIONS

Bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

Bloxroute.com [online], "BloxRoute," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Extended European Search Report in European Application No. 21179950.7, dated Nov. 15, 2021, 7 pages.

* cited by examiner

302 — Registering, according to a registration request submitted by each blockchain node, the each blockchain node to a blockchain node set indicated in the registration request, to respectively generate a routing policy corresponding to the each blockchain node, the routing policy includes a blockchain node set to which the each blockchain node belongs and a relay node to which the each blockchain node is connected 304 — Determining, when receiving a blockchain message sent for a target blockchain node in a target blockchain node set, a target relay node connected to the target blockchain node in the blockchain relay communication network according to a tree-structured routing table 306 — Transmitting the blockchain message to the target blockchain node by using the target relay node

FIG. 3

MESSAGE TRANSMISSION METHODS AND APPARATUSES

CROSS-REFERENCE TO RELATED APPLICATIONS

This application claims priority to Chinese Patent Application No. 202011021693.4, filed on Sep. 25, 2020, which is hereby incorporated by reference in its entirety.

TECHNICAL FIELD

One or more embodiments of this specification relate to the field of blockchain technologies, and in particular, to a message transmission methods and apparatuses.

BACKGROUND

The blockchain technology (also referred to as the distributed ledger technology) is a decentralized distributed database technology, featured by being decentralized, open, transparent, immutable, trustworthy, or the like, and is applicable to many application scenarios with high needs on data reliability.

SUMMARY

In view of this, one or more embodiments of this specification provide message transmission methods and apparatuses.

To achieve the previously mentioned objective, the one or more embodiments of this specification provide the following technical solutions.

According to a first aspect of the one or more embodiments of this specification, a message transmission method is provided, which is applicable to a first relay node in a blockchain relay communication network, and includes:

registering, according to a registration request submitted by each blockchain node, the each blockchain node to a blockchain node set indicated in the registration request, to respectively generate a routing policy corresponding to the each blockchain node, the routing policy includes a blockchain node set to which the each blockchain node belongs and a relay node to which the each blockchain node is connected;

determining, when receiving a blockchain message sent for a target blockchain node in a target blockchain node set, a target relay node connected to the target blockchain node in the blockchain relay communication network according to a tree-structured routing table, the tree-structured routing table is obtained by organizing the routing policies in a tree structure, the routing policies are corresponding to paths from a root node to leaf nodes in the tree structure respectively, a leaf node in each path representing a blockchain node corresponding to a corresponding routing policy, a value of the leaf node is information about a relay node connected to the corresponding blockchain node, and a non-leaf node representing a blockchain node set included in the corresponding routing policy; and transmitting the blockchain message to the target blockchain node by using the target relay node.

According to a second aspect of the one or more embodiments of this specification, a message transmission apparatus is provided, which is applicable to a first relay node in a blockchain relay communication network, and includes:

a registration unit, configured to register, according to a registration request submitted by each blockchain node, the each blockchain node to a blockchain node set indicated in the registration request, to respectively generate a routing policy corresponding to the each blockchain node, the routing policy includes a blockchain node set to which the each blockchain node belongs and a relay node to which the each blockchain node is connected;

a determining unit, configured to determine, when receiving a blockchain message sent for a target blockchain node in a target blockchain node set, a target relay node connected to the target blockchain node in the blockchain relay communication network according to a tree-structured routing table, the tree-structured routing table is obtained by organizing the routing policies in a tree structure, the routing policies are corresponding to paths from a root node to leaf nodes in the tree structure respectively, a leaf node in each path representing a blockchain node corresponding to a corresponding routing policy, a value of the leaf node is information about a relay node connected to the corresponding blockchain node, and a non-leaf node representing a blockchain node set included in the corresponding routing policy; and a transmission unit, configured to transmit the blockchain message to the target blockchain node by using the target relay node.

According to a third aspect of the one or more embodiments of this specification, an electronic device is provided, including:

a processor; and a memory configured to store instructions executable by the processor, the processor, configured to execute the executable instructions to implement the method according to the first aspect.

According to a fourth aspect of the one or more embodiments of this specification, a computer-readable storage medium is provided, storing computer instructions, the instructions, when executed by a processor, implementing the steps of the method according to the first aspect.

BRIEF DESCRIPTION OF THE DRAWINGS

FIG. 3 is a flowchart of a message transmission method, according to an explanatory embodiment.

DESCRIPTION OF THE EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The implementations described in the following explanatory embodiments are not all the implementations consistent with one or more embodiments of this specification, but are instead only examples of methods and apparatuses that are described in detail in the appended claims and that are consistent with some aspects of one or more embodiments of this specification.

It should be noted that in other embodiments, the steps of corresponding methods are not necessarily performed according to sequences shown and described in this specification. In some other embodiments, the methods can include more or fewer steps than those described in this specification. In addition, a single step described in this specification can be divided into a plurality of steps for description in other embodiments, and a plurality of steps described in this specification can be combined into a single step for description in other embodiments.

Figure 1:
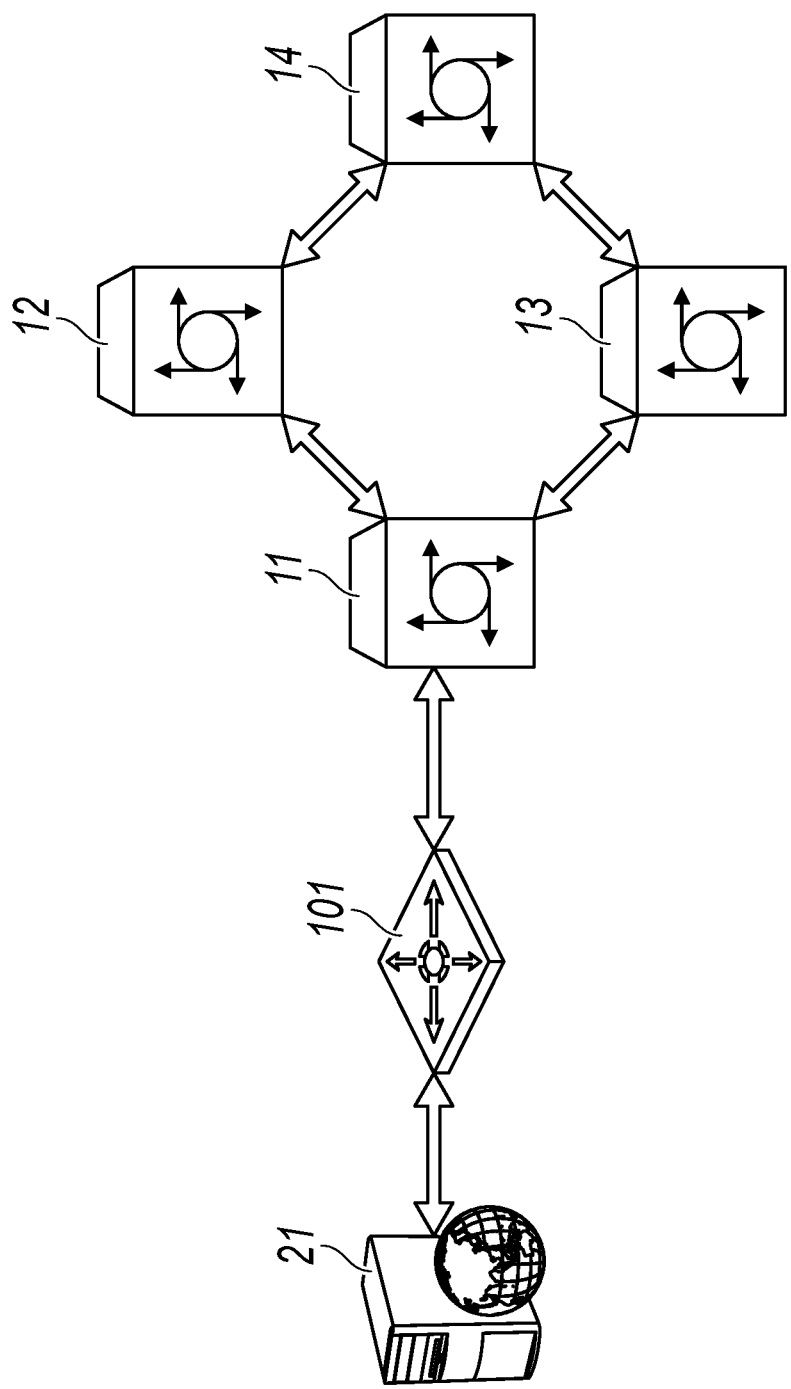
FIG. 1 is a schematic interaction diagram of a blockchain node and a blockchain relay communication network, according to an explanatory embodiment.

FIG. 1 is a schematic interaction diagram of a blockchain node and a blockchain relay communication network according to an explanatory embodiment. As shown in FIG. 1, assume that the blockchain relay communication network includes a plurality of several relay nodes such as a relay 11, a relay 12, a relay 13, and a relay 14. Taking the relay 11 as an example, the relay 11 can be connected to a node 21 in a blockchain network by using a gateway 101. Similarly, other relay nodes can also be connected to other blockchain nodes in the blockchain network. The gateway 101 is configured to assist the node 21 in accessing the blockchain relay communication network. The gateway 101 is logically equivalent to a blockchain node in the blockchain network, but the gateway 101 does not participate in blockchain consensus. In this way, the node 21 can communicate with the gateway 101 by using a communication protocol adopted by the blockchain network, and the gateway 101 does not have a negative impact on processes such as the consensus process in the blockchain network. The gateway 101 is substantially an adaptation program for the node 21 to access the blockchain relay communication network. The adaptation program can be deployed on the node 21, the relay 11, or another device independent of the relay 11 and the node 21, and is not limited in this specification.

The blockchain network includes a plurality of blockchain nodes, and communication operations such as consensus, transaction transmission, and block synchronization need to be implemented between the blockchain nodes. In the related art, a peer-to-peer (P2P) technology is directly used for communication between the blockchain nodes to transmit transactions, blocks, or the like, but due to various network factors, a communication delay is long and stability is poor, which cannot meet application needs. Therefore, similar to the node 21, each blockchain node can respectively access the relay node in the blockchain relay communication network. In this way, the blockchain nodes can communicate with each other by using the blockchain relay communication network. The blockchain relay communication network is a backbone relay communication network for real-time transmission in the blockchain, and the relay nodes can communicate and interact with each other by using high-quality bandwidth with a high QoS guarantee. Therefore, the blockchain relay communication network takes over intermediate links for communication between the blockchain nodes, which can reduce the communication delay and improve the stability, thereby significantly improving communication quality between the blockchain nodes.

The blockchain relay communication network can be applied to various types of blockchain networks, including a public chain, a private chain, a consortium chain, or the like. For example, the blockchain relay communication networks applied to the public chains mainly include Falcon, Fast Bitcoin Relay Network (FBRN), Fast Internet Bitcoin Relay Engine (FIBER), or the like, and the blockchain relay communication networks applied to the consortium chains mainly include BloXRoute, Blockchain Transmission Network (BTN), or the like. However, the blockchain relay communication network in the related art can only function as a relay during communication between the blockchain nodes, and have no essential difference from a P2P transmission mechanism adopted when no blockchain relay communication network is used.

Figure 2:
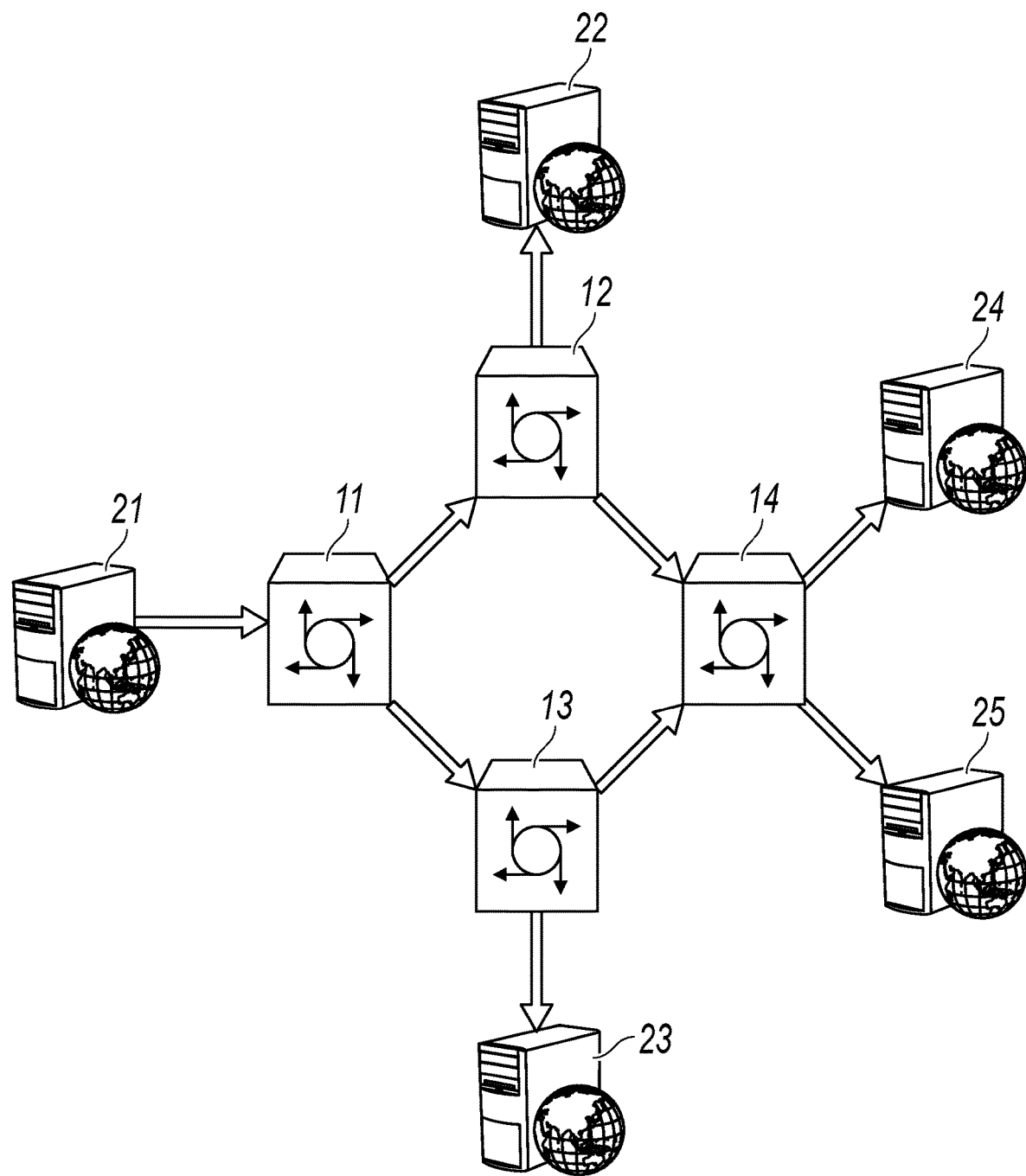
FIG. 2 is a schematic diagram of a message transmission scenario, according to an explanatory embodiment.

A message transmission scenario shown in FIG. 2 is used as an example. assume that the node 21 in the blockchain network is connected to the relay 11 in the blockchain relay communication network, a node 22 is connected to the relay 12, a node 23 is connected to the relay 13, and nodes 24 and 25 are connected to the relay 14. To facilitate understanding, the previously mentioned gateway (such as the gateway 101) is omitted herein. When the node 21 needs to send a message to the node 22 and the node 24, the node 21 first sends the message to the relay 11, and the relay 11 forwards the message respectively to the relay 12 and the relay 13 respectively. The relay 12 forwards the message to the node 22, and also forwards the message to the relay 14. The relay 13 forwards the message to the node 23 on one hand and forwards the message to the relay 14 on the other hand. The relay 14 forwards the message to the node 24 and the node 25. Finally, the node 22 and the node 24 receive the message from the node 21, but the node 23 and the node 25 also receive the message. The operation of the relay 14 forwarding the message to the node 25, the operation of the relay 11 forwarding the message to the relay 13, and the operation of the relay 13 respectively forwarding the message to the relay 14 and the node 23 are unnecessary, and waste communication resources.

To save communication resources and implement more efficient communication by using the blockchain relay communication network, a new message transmission solution is provided in this specification.

FIG. 3 is a flowchart of a message transmission method according to an explanatory embodiment. As shown in FIG. 3, the method is applicable to a first relay node in a blockchain relay communication network. The method can include the following steps:

Step 302. Registering, according to a registration request submitted by each blockchain node, the each blockchain node to a blockchain node set indicated in the registration request, to respectively generate a routing policy corresponding to the each blockchain node, the routing policy includes a blockchain node set to which the each blockchain node belongs and a relay node to which the each blockchain node is connected.

The blockchain relay communication network can be layered on a control plane and a data plane, and a forwarding control policy of network data can be separated from a data transmission process, so that the forwarding control policy can be freely defined, and the data transmission can be more general and efficient. For the blockchain relay communication network, the control plane can be understood as a message routing policy, and the data plane refers to transmission of a blockchain message in the blockchain relay communication network. By submitting the registration request, the blockchain node can freely configure a blockchain node set to which blockchain node belongs according to application (or service) needs, to adjust a message routing related to the blockchain node.

In the previously described method, the transmission process of the blockchain message in the blockchain relay communication network is optimized. Taking the previously described nodes 21 to 25 as an example again, assume that the node 21 intends to send a blockchain message to the node 22 and the node 24. If the node 22 and the node 24 are added to the same blockchain node set by sending registration requests in advance, the node 21 only needs to mark a target object of the blockchain message as the blockchain node set, to ensure that the blockchain relay communication network only sends the blockchain message to the node 22 and the node 24 that belong to the blockchain node set. For example, the node 21 sends the blockchain message to the relay 11, the relay 11 forwards the blockchain message to the relay 12, the relay 12 respectively forwards the blockchain message to the node 22 and the relay 14, and the relay 14 forwards the blockchain message to the node 24, thereby avoiding sending the blockchain message to other relay nodes and blockchain nodes to avoid waste of the communication resources. The transmission process of the blockchain message in the blockchain relay communication network is described in detail below.

If the registration request includes a set identifier, the relay node can register the blockchain node initiating the registration request to a blockchain node set corresponding to the set identifier. If the blockchain node set corresponding to the set identifier is created in advance, the blockchain node is added to the blockchain node set; if the blockchain node set corresponding to the set identifier is not created in advance, the blockchain node set is created and the blockchain node is added to the blockchain node set.

If the registration request does not include a set identifier, the relay node can register the blockchain node initiating the registration request to a default blockchain node set. The default blockchain node set can include all blockchain nodes in the blockchain network to which the blockchain node initiating the registration request belongs; or, the default blockchain node set can be another predefined blockchain node set, depending on a predefined policy adopted by the blockchain relay communication network.

When blockchain node set added to the blockchain nodes is not considered, a corresponding routing policy of the blockchain node in the blockchain relay communication network only involves a node ID of the blockchain node and a relay ID of a relay node connected to the blockchain node. For example, a routing policy corresponding to the node 21 in FIG. 2 is "node 21-relay 11", and a routing policy corresponding to the node 22 is "node 22-relay 12", or the like. After considering that the blockchain node is added to the blockchain node set, information related to the blockchain node set is added to the routing policy corresponding to the blockchain node in the blockchain relay communication network. For example, when the node 21 is added to a blockchain node set SID1, the routing policy corresponding to the node 21 can be updated from the "node 21-relay 11" to "SID1/node 21-relay 11", indicating that the node 21 belongs to the blockchain node set SID1.

The same blockchain node can be added to one or more blockchain node sets according to application needs. That is, blockchain nodes included in different blockchain node sets can overlap. For example, a blockchain node set C1 can include the node 21, the node 22, and the node 23, and a blockchain node set C2 can include the node 22, the node 23, the node 24, and the node 25, so that the node 22 and the node 23 belong to the two blockchain node sets C1 and C2 at the same time. When a blockchain node is respectively added to a plurality of blockchain node sets at the same time, a plurality of routing policies are generated correspondingly. For example, the node 21 can be respectively added to the blockchain node set SID1 and the blockchain node set SID2. In this case, the node 21 can correspond to two routing policies, namely, "SID1/node 21-relay 11" respectively corresponding to the blockchain node set SID1 and "SID2/node 21-relay 11" corresponding to the blockchain node set SID2.

Figure 4:
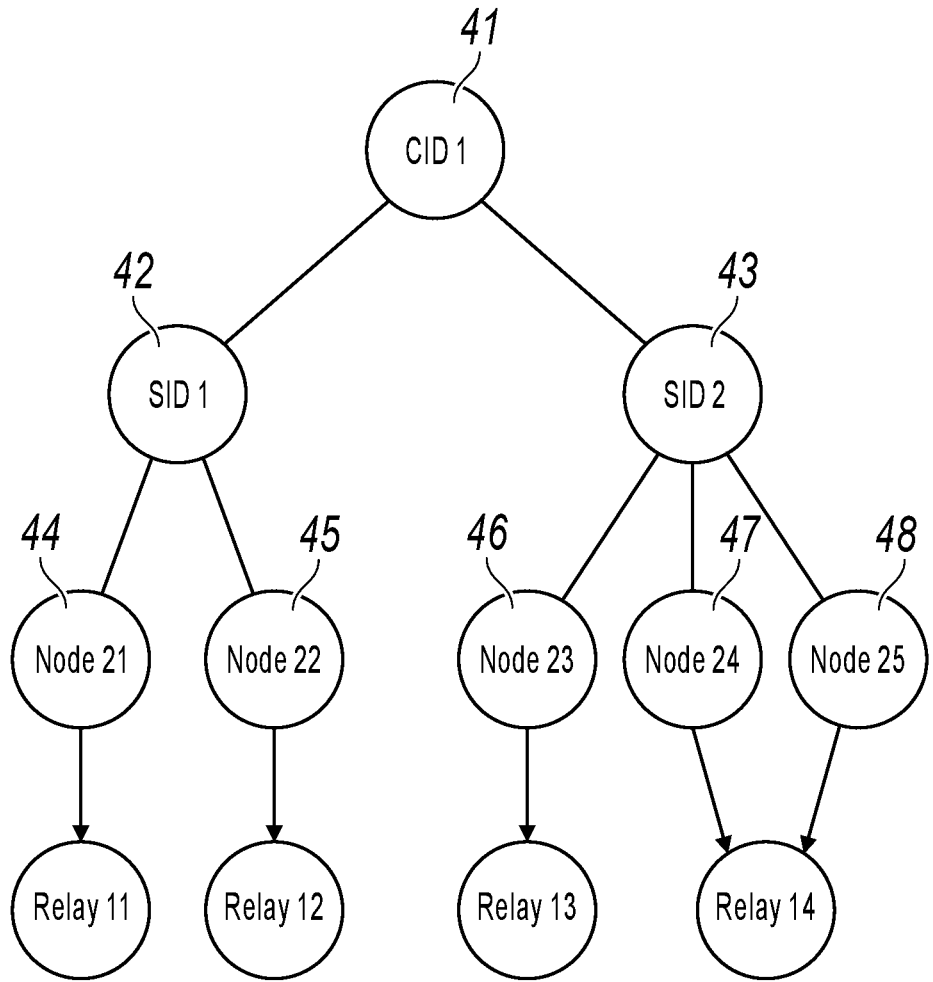
FIG. 4 is a schematic diagram of a tree-structured routing table, according to an explanatory embodiment.

There can be a hierarchical relationship between the blockchain node sets. Based on the hierarchical relationship, the blockchain node set to which the blockchain node belongs, and the connection relationship between the blockchain node and the relay node, the routing policies corresponding to the blockchain nodes in the blockchain relay communication network can be formed into a tree structure, that is, a tree-structured routing table. The tree-structured routing table is obtained by organizing the routing policies in a tree structure, the routing policies are corresponding to paths from a root node to leaf nodes in the tree-like structure respectively, a leaf node in each path representing a blockchain node corresponding to a corresponding routing policy, a value of the leaf node is information about a relay node connected to the corresponding blockchain node, and a non-leaf node representing a blockchain node set included in the corresponding routing policy. For example, as shown in FIG. 4, assume that both the node 21 and the node 22 belong to the blockchain node set SID1, the node 23, the node 24, and the node 25 belong to the blockchain node set SID2, and both the blockchain node set SID1 and the blockchain node set SID2 belong to a blockchain node set CID1 (therefore, the nodes 21 to 25 actually belong to the blockchain node set CID1). Therefore, the blockchain node set CID1 corresponds to a root node 41 in the tree-structured routing table, the blockchain node set SID1 and the blockchain node set SID2 respectively correspond to sub-nodes 42 and 43 of the root node 41 in the tree-structured routing table, the node 21 and the node 22 respectively correspond to sub-nodes 44 and 45 of the node 42 in the tree-structured routing table, and the node 23, the node 24, and the node 25 respectively correspond to sub-nodes 46 to 48 of the node 43 in the tree-structured routing table. The nodes 44 to 48 are leaf nodes of the tree-structured routing table, and values of the leaf nodes are relay IDs of relay nodes connected to the nodes. For example, if the node 21 is connected to the relay 11, a value of the leaf node 44 is the relay 11.

It should be noted that in addition to that a leaf node in each path represents the blockchain node corresponding to the corresponding routing policy, a value of the leaf node represents information about the relay node connected to the corresponding blockchain node, and a non-leaf node represents a blockchain node set included in the corresponding routing policy, it can actually be considered that a leaf node in each path represents a relay node (that is, the relay node connected to the blockchain node corresponding to the corresponding routing policy), and accordingly a non-leaf node adjacent to the leaf node represents the blockchain node corresponding to the corresponding routing policy, and other non-leaf nodes represent a blockchain node set included in the corresponding routing policy. For example, in FIG. 4, it can be considered that the relay 11, the relay 12, the relay 13, and the relay 14 are leaf nodes, the node 21 to the node 25 are non-leaf nodes respectively adjacent to the leaf nodes in corresponding paths, and other non-leaf nodes are respectively the root node 41, the sub-nodes 42 and 43.

Certainly, the tree-structured routing table shown in FIG. 4 shows routing relationships in a logical level, and the relay node usually adopts other forms when actually recording the routing relationships. For example, for each blockchain node, a relay node can generate a routing policy corresponding to the blockchain node according to a path from the root node to a leaf node corresponding to the blockchain node, and adjacent nodes are separated by a predefined separator. Therefore, a routing policy corresponding to the node 21 can be CID1/SID1/Node1:tn1, Node1 is a node ID of the node 21, and tn1 is a relay ID of the relay 11. Similarly, a routing policy corresponding to the node 23 can be CID1/SID2/Node3:tn3, Node3 is a node ID of the node 23, and tn3 is a relay ID of the relay 13, and so on.

By describing the nodes on the whole path where the blockchain nodes are located in the routing policy, a set identifier of a lower-layer blockchain node set can be more flexible. For example, on the basis of the blockchain node sets SID1 and SID2, next-layer blockchain node sets are further included, such as a blockchain node set 1 belonging to the blockchain node set SID1 and a blockchain node set 2 belonging to the blockchain node set SID2. Therefore, even if the blockchain node set 1 and the blockchain node set 2 adopt the same set identifier, the two sets can also be distinguished by a difference between the blockchain node sets SID1 and SID2.

Step 304. Determining, when receiving a blockchain message sent for a target blockchain node in a target blockchain node set, a target relay node connected to the target blockchain node in the blockchain relay communication network according to a tree-structured routing table.

The first relay node can receive the blockchain message from a blockchain node connected to the first relay node, and transmit the blockchain message by using the technical solution of this specification. For example, the first relay node forwards the blockchain message only to a target relay node, and does not forward the blockchain message to any other relay node. Certainly, the first relay node can alternatively receive the blockchain message from another relay node in the blockchain relay communication network. In this case, the first relay node can be one of at least one target relay node. Alternatively, the first relay node may not be a target relay node, but the blockchain message needs to be forwarded to the target relay node by using the first relay node. For example, in the embodiment shown in FIG. 2, assume that the node 21 intends to send a blockchain message to a target blockchain node set, a member of the target blockchain node set is the node 24. In this case, the relay 11 first receives the blockchain message from the node 21, and determines that a target relay node is the relay 14 connected to the node 24 and a routing forwarding path between the relay 11 and the relay 14 is "relay 11-relay 12-relay 14". Therefore, the relay 11 forwards the blockchain message to the relay 12. After receiving the blockchain message, the relay 12 finds that the target relay node is the relay 14. Therefore, the relay 12 forwards the blockchain message to the relay 14. After receiving the blockchain message, the relay 14 finds that the relay 14 itself is the target relay node and a target blockchain node is the node 24. Therefore, the relay 14 forwards the blockchain message to the node 24.

The target blockchain node in this specification is a message receiver indicated in the blockchain message by the blockchain node. After receiving the blockchain message, the first relay node can determine the target blockchain node by using identifier information recorded in the blockchain message. The identifier information included in the blockchain message can be a node identifier or a set identifier; or include the node identifier and the set identifier at the same time.

The node identifier can include an identifier of a blockchain node set to which the target blockchain node belongs and an identifier of the target blockchain node. For example, in the embodiment shown in FIG. 4, if the node 23 is intended to be used as a target blockchain node, anode identifier corresponding to the node 23 can be obtained by combining an identifier "CID1/SID2" of a blockchain node set and a node ID "Node3" of the node 23. For example, the node identifier obtained after combining can be "CID1/SID2/Node3". The node identifier includes both the node ID of the node 23 and the identifier of the blockchain node set to which the node 23 belongs, so that another blockchain node with a node identifier of "Node3" in another blockchain node set, if any, can be clearly distinguished from the node 23. Certainly, if "Node3" uniquely corresponds to the node 23, "Node3" can also be directly used as the node identifier corresponding to the node 23.

The set identifier is an identifier of the target blockchain node set. For example, the previously described identifier "CID1/SID2" is an identifier corresponding to the blockchain node set SID2 to which the node 23 belongs. As described above, the blockchain node set can include one or more registered blockchain nodes. In general, especially when there are a relatively large quantity of blockchain nodes or members in the blockchain node set often change, the complexity of the blockchain message can be reduced by defining a routing policy on a per-blockchain node set basis and adding a corresponding set identifier to the blockchain message.

Figure 5:
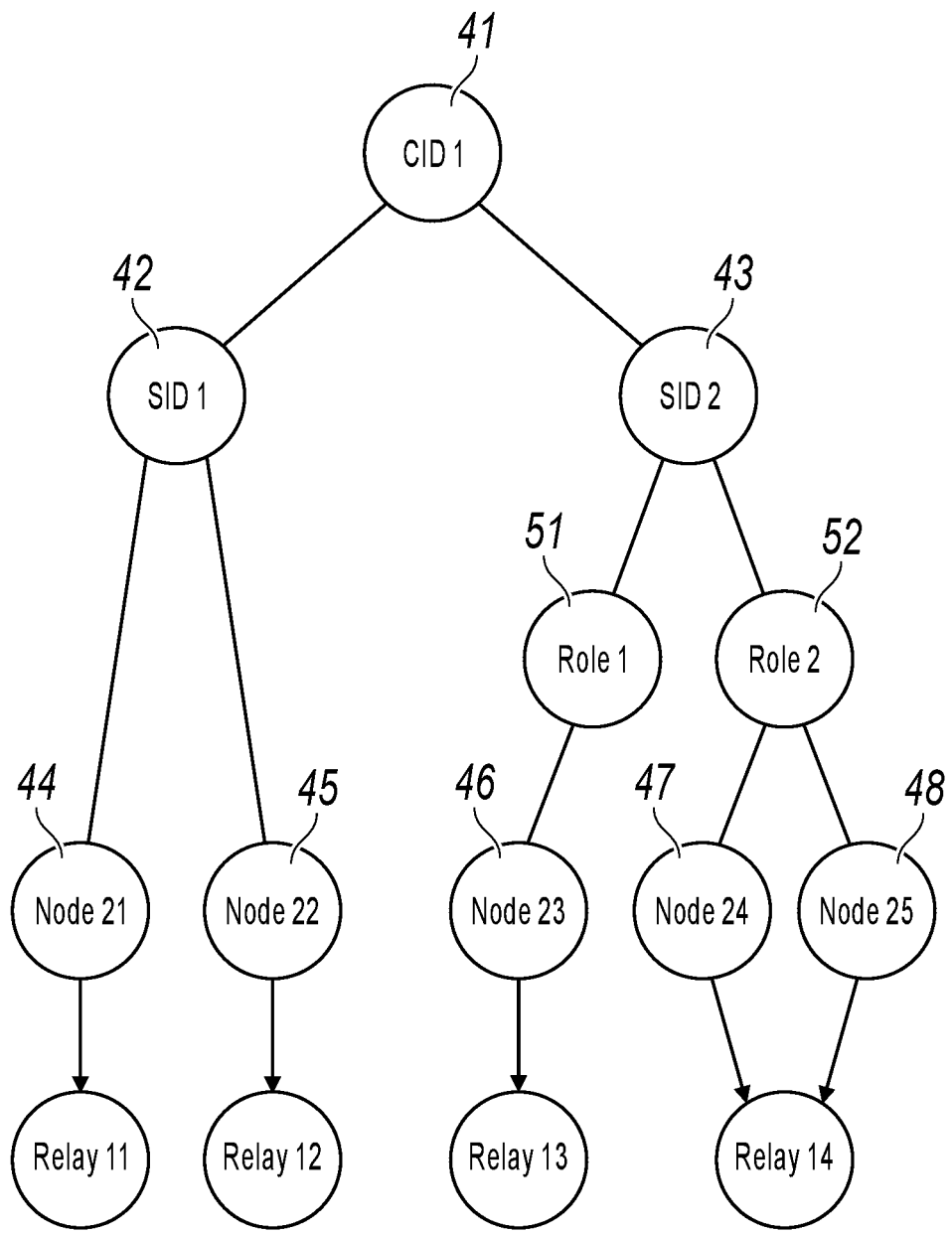
FIG. 5 is a schematic diagram of a tree-structured routing table in association with role types, according to an explanatory embodiment.

In addition to classifying blockchain nodes into different blockchain node sets, blockchain nodes included in a blockchain node set can be further classified, to implement finer-granularity routing configuration and message transmission. For example, the blockchain nodes in the blockchain node set can be classified into a plurality of role types. In an example, the blockchain nodes are classified into role types such as a consensus node and a ledger node according to different functions implemented by the blockchain nodes, or in another example, the blockchain nodes are classified into different role types according to application needs or other dimensions, which is not limited in this specification. Therefore, the registration request initiated by the blockchain node can include role type information, and the relay node can record, according to the role type information, a role type corresponding to each blockchain node in a corresponding blockchain node set, and record the role type of each blockchain node in the blockchain node set into a corresponding routing policy. Correspondingly, after receiving the blockchain message, the first relay node can read identifier information (including the node identifier and/or the set identifier as described above) and a target role type included in the blockchain message, determine, according to the tree-structured routing table, a routing policy matching the identifier information and the target role type, and use a relay node included in the determined routing policy as the target relay node. Taking the previously described tree-structured routing table as an example, assuming that a role 1 and a role 2 are defined in the blockchain node set SID2, the tree-structured routing table shown in FIG. 4 can be updated to that shown in FIG. 5, where a new layer can be added under the node 43 corresponding to the blockchain node set SID2, the layer includes a node 51 corresponding to the role 1 and a node 52 corresponding to the role 2. If the blockchain node 23 belongs to the role 1 and the blockchain nodes 24 and 25 belong to the role 2, the node 46 corresponding to the blockchain node 23 can be used as a sub-node of the node 51, the nodes 47 and 48 corresponding to the blockchain nodes 24 and 25 can be used as sub-nodes of the node 52, and accordingly, the routing policy corresponding to the blockchain node 23 can be updated to CID1/SID2/Role1/Node3:tn3, Role1 representing the role 1, Node 3 is a node ID of the blockchain node 23, and tn3 is a relay ID of the relay 13. Similarly, a routing policy corresponding to the blockchain node 24 can be updated to CID1/SID2/Role2/Node4:tn4, Role2 representing the role 2, Node4 is a node ID of the blockchain node 24, and tn4 is a relay ID of the relay 14.

Correspondingly, in a case that the role type is considered, not only a target blockchain node set needs to be indicated in the blockchain message, but also the blockchain node further needs to indicate a target role type in the blockchain message. After receiving the blockchain message, the first relay node can read identifier information (including the node identifier and/or the set identifier as described above) and the target role type indicated in the blockchain message, determine, according to the tree-structured routing table, a routing policy matching the identifier information and the target role type, and use a relay node included in the determined routing policy as the target relay node. Therefore, for a blockchain node set corresponding to the set identifier, a blockchain node that is already registered to the blockchain node set and corresponds to the target role type is determined as the target blockchain node, and a blockchain node that is already registered to the blockchain node set but does not correspond to the target role type cannot receive the blockchain message.

In the process in which the first relay node determines, according to the tree-structured routing table, a target relay node connected to the a target blockchain node in the blockchain relay communication network, if the first relay node receives the blockchain message from the connected blockchain node, the first relay node can query information about a blockchain node connected to the first relay node and the tree-structured routing table, until all target relay nodes respectively connected to the a target blockchain node are determined. Taking FIG. 2 as an example, assume that the first relay node is the relay 11. After receiving the blockchain message from the node 21, the relay 11 can read identifier information included in the blockchain message. The relay 11 records information about a blockchain node connected to the relay 11, and thus can determine, according to the information, whether the identifier information corresponds to the blockchain node connected to the relay 11. If all blockchain nodes indicated in the identifier information are connected to the relay 11, it can be determined that the relay 11 is a target relay node corresponding to all target blockchain nodes, the tree-structured routing table does not need to be queried, and the relay 11 can forward the blockchain message to the target blockchain nodes corresponding to the identifier information. If none of blockchain nodes indicated in the identifier information is connected to the relay 11 or only some of the blockchain nodes are connected to the relay 11, it indicates that there is at least one target blockchain node that is not connected to the relay 11. Therefore, the relay 11 needs to query the tree-structured routing table to determine a target relay node corresponding to the at least one target blockchain node. For example, when a target blockchain node that is found according to the tree-structured routing table is the node 24, and a corresponding target relay node is the relay 14, the relay 11 forwards the blockchain message to the relay 14, for the relay 14 to further forward the blockchain message to the node 24.

Figure 6:
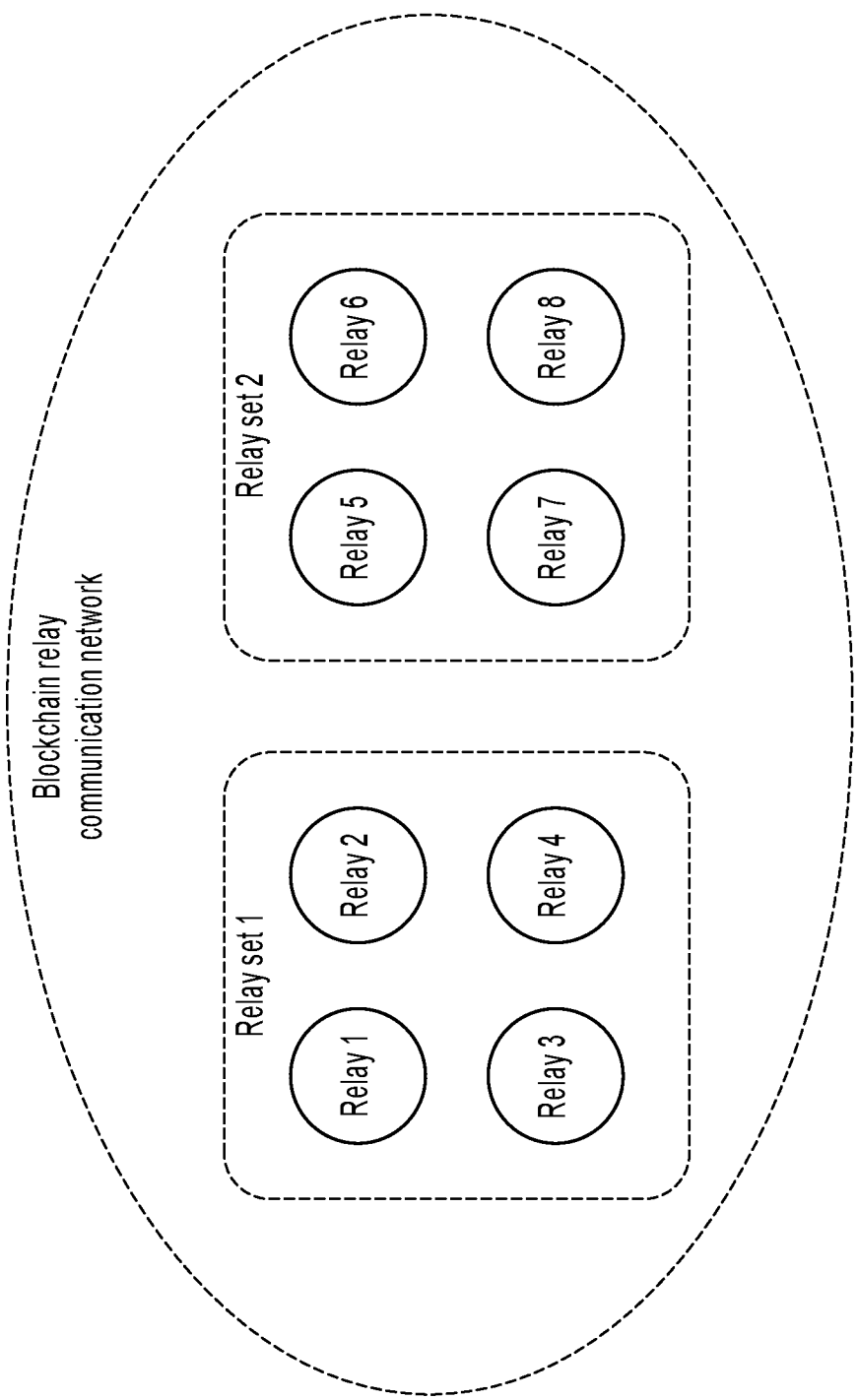
FIG. 6 and FIG. 7 are schematic diagrams of performing set classification on relay nodes, according to an explanatory embodiment.

Relay nodes included in the blockchain relay communication network can be classified into a plurality of relay node sets, each relay node set includes one or more relay nodes, and each relay node belonging to a unique relay node set. For example, in the embodiment shown in FIG. 6, there are a total of eight relay nodes, that is, a relay 1 to a relay 8. The relay 1 to the relay 4 are classified into a relay set 1, and the relay 5 to the relay 8 are classified into a relay set 2. Certainly, a relay node set to which each relay node belongs, a quantity of relay nodes included in each relay node set, and the like can be set according to actual needs, for example, relay nodes that are deployed at the same position or at neighboring positions can be classified into the same relay node set, which is not limited in this specification.

Figure 7:
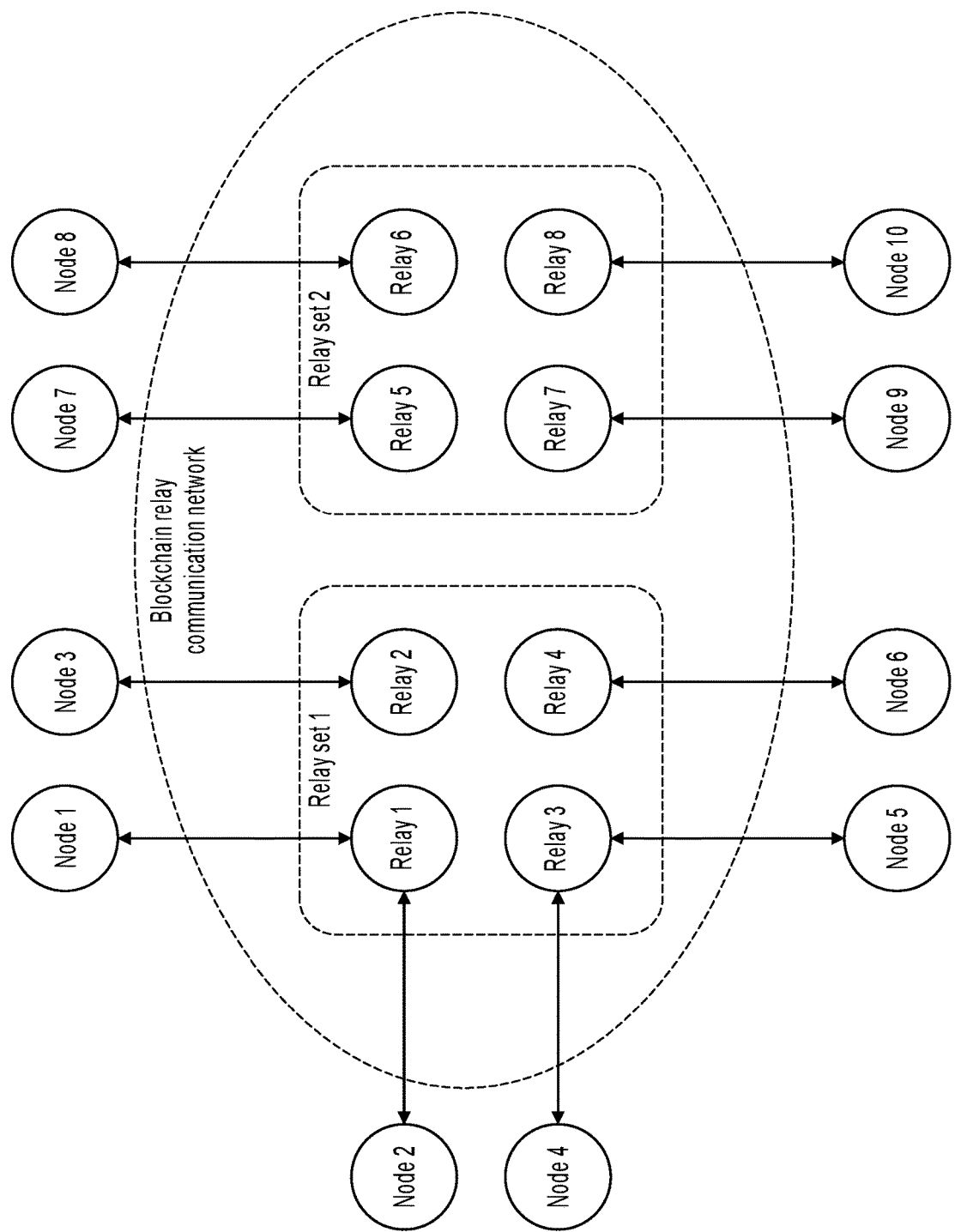

Relay nodes in the same relay node set can be further classified into primary nodes and secondary nodes. A relay node set generally includes one primary node, with the other relay nodes are secondary nodes. The primary node is configured to implement communication and interaction between different relay node sets, and communicate and interact with the secondary nodes in the relay node set to which the primary node belongs. A secondary node usually communicates and interacts only with the primary node in the relay node set to which the secondary node belongs. Therefore, when the first relay node receives the blockchain message from another relay node rather than directly from the blockchain node, there can be a plurality of cases:

If the first relay node is a primary node in a relay node set to which the first relay node belongs, and the another relay node is a second relay node in another relay node set, the first relay node can query information about a blockchain node connected to the first relay node and the tree-structured routing table, until all target relay nodes connected to the target blockchain node in the relay node set to which the first relay node belongs are determined. As shown in FIG. 7, assuming that the first relay node is the relay 1 and the second relay node is the relay 5, the relay 5, after receiving the blockchain message sent by the node 7, can determine that the target blockchain node is the node 1 and the target relay node is the relay 1 in the previously described method, and thus forwards the blockchain message to the relay 1. Alternatively, the relay 5 can determine that the target blockchain node is the node 3 and the target relay node is the relay 2. However, because the relay 2 is in the relay set 1 and the relay 1 is a primary node in the relay set 1, the relay 5 forwards the blockchain message to the relay 1, for the relay 1 to further determine the target relay node (for example, the relay 2) in the relay set 1.

If the first relay node is a secondary node in a relay node set to which the first relay node belongs, and the another relay node is a primary node in the relay node set to which the first relay node belongs, the first relay node queries information about a blockchain node connected to the first relay node, to determine whether the first relay node is a target blockchain node. As shown in FIG. 7, assuming that the first relay node is the relay 2, the second relay node is the relay 1, the relay 1 is a primary node, and the relay 2 is a secondary node. After obtaining the blockchain message, the relay 1 determines that the relay 2 belongs to the target relay node, so that the relay 1 can forward the blockchain message to the relay 2, and the relay 2 only needs to be concerned about whether the relay 2 itself is a target relay node. Therefore, the relay 2 only needs to query information about a blockchain node connected to the relay 2, and after determining that the relay 2 is a target relay node and determining a target blockchain node connected to the relay 2, forwards the blockchain message to the determined target blockchain node.

In an embodiment such as that shown in FIG. 2, both the quantity of blockchain nodes and the quantity of the relay nodes are limited. The relay nodes 11 to 14 can respectively maintain a full routing table. The full routing table includes all routing policies corresponding to the blockchain nodes. The relay nodes 11 to 14 can quickly determine, according to the full routing table, a target blockchain node and a target relay node connected to the target blockchain node. However, if there is a large quantity of routing policies, it will take a relatively long time for the relay nodes to forward the blockchain message by only using the full routing table, resulting in inefficient forwarding of the blockchain message.

Therefore, this specification provides a two-layer routing table design solution. The solution is related to the previously described solution of classifying relay nodes into different sets. For example, a corresponding primary routing table can be created for each relay node set. The primary routing table is configured for recording routing policies corresponding to blockchain nodes respectively connected to all relay nodes in the relay node set, but does not include routing policies corresponding to blockchain nodes connected to relay nodes in another relay node set. Taking FIG. 7 as an example, the node 1 to the node 6 are connected to the relay 1 to the relay 4 in the relay set 1, and the node 7 to the node 10 are connected to the relay 5 to the relay 8 in the relay set 2. Therefore, a primary routing table corresponding to the relay set 1 only includes routing policies corresponding to the node 1 to the node 6, but does not include routing policies corresponding to the node 7 to the node 10. A primary routing table corresponding to the relay set 2 only includes routing policies of the node 7 to the node 10, but does not include routing policies corresponding to the node 1 to the node 6.

Each relay node can further maintain a secondary routing table besides maintaining a corresponding primary routing table based on the relay node set to which each relay node belongs. The secondary routing table can be the previously described full routing table, that is, configured for recording routing policies corresponding to blockchain nodes respectively connected to all the relay nodes. In this case, all the relay nodes maintain the same secondary routing table. For example, in the embodiment shown in FIG. 7, the secondary routing table can include the routing policies respectively corresponding to the node 1 to the node 10. Alternatively, the secondary routing table can include all the routing policies in the full routing table except the routing policies included in the primary routing table. In this case, relay nodes in the same relay node set maintain the same secondary routing table, relay nodes in different relay node sets maintain different secondary routing tables, and the primary routing table and the secondary routing table maintained by each relay node can form the previously described full routing table. Taking FIG. 7 as an example, a secondary routing table maintained by the relay 1 to the relay 4 can include routing policies respectively corresponding to the node 7 to the node 10, and a secondary routing table maintained by the relay 5 to relay 8 can include routing policies respectively corresponding to the node 1 to the node 6.

According to the primary routing table and the secondary routing table, for the first relay node described in step 304, a corresponding primary routing table is configured for recording routing policies corresponding to blockchain nodes respectively connected to all relay nodes in the relay node set to which the first relay node belongs, and the secondary routing table is configured for recording routing policies corresponding to blockchain nodes respectively connected to all relay nodes in the blockchain relay communication network, or routing policies corresponding to blockchain nodes respectively connected to the remaining relay nodes that are not added to the relay node set (that is, the relay node set to which the first relay node belongs) in the blockchain relay communication network.

When receiving the blockchain message from the connected blockchain node, the first relay node sequentially queries the information about the blockchain node connected to the first relay node, the primary routing table, and the secondary routing table, until all target relay nodes respectively connected to the least one target blockchain node are determined. The information about the blockchain nodes connected to the first relay node can be routing policies corresponding to the blockchain nodes. Alternatively, the first relay node can maintain the information about the blockchain nodes in other manners.

During querying, if the first relay node cannot determine whether all target relay nodes have been found, the first relay node needs to sequentially traverse the information about the blockchain node connected to the first relay node, the primary routing table, and the secondary routing table, and use all matched relay nodes that are found as the target relay node. Taking FIG. 7 as an example, assuming that the first relay node is the relay 1, the relay 1 receives a first blockchain message from the node 1, and target blockchain nodes of the first blockchain message are the node 2, the node 3, the node 7, and the node 8. The first blockchain message can include a set identifier of a target blockchain node set. In an example, the set identifier is SID1, and the node 2, the node 3, the node 7, and the node 8 are preregistered to the blockchain node set SID1. In another example, the set identifier can be CID1/SID1, that is, the target blockchain node set is the subset SID1 included in the blockchain node set CID1, and the node 2, the node 3, the node 7, and the node 8 are preregistered to the subset SID1. The first blockchain message can also include a node identifier of the target blockchain node. For example, node identifiers corresponding to the node 2, the node 3, the node 7, and the node 8 can be respectively Node2, Node3, Node7, and Node8. It can be seen that when there is a large quantity of target blockchain nodes, compared with the node identifier, the set identifier can express the same information (indicating which blockchain node is the target blockchain nodes) by using less content, to reduce the data size of the first blockchain message, and improve the efficiency of transmission of the first blockchain message. Correspondingly, a processing process implemented by the relay 1 for the received first blockchain message includes the following steps:

First, the relay 1 can find that the node 2 is a target blockchain node by querying information about a blockchain node connected to the relay 1, and determine that the relay 1 itself is a target relay node; therefore, the relay 1 can directly forward the first blockchain message to the node 2.

Then, the relay 1 continues to query the primary routing table. The primary routing table records the routing policies of the node 1 to the node 6, so the relay 1 can find that the node 3 is a target blockchain node, and determine that the relay 2 connected to the node 3 is a target relay node. Therefore, the relay 1 can forward the first blockchain message to the relay 2, for the relay 2 to forward the first blockchain message to the node 3.

Finally, the relay 1 continues to query the secondary routing table. The secondary routing table records at least the routing policies of the node 7 to the node 10, so that the relay 1 can find that the node 7 and the node 8 are target blockchain nodes, and determine that the relay 5 and the relay 6 respectively connected to the node 7 and the node 8 belong to target relay nodes. Therefore, the relay 1 can forward the first blockchain message to the relay 5 and the relay 6, for the relay 5 and the relay 6 to respectively forward the first blockchain message to the node 7 and the node 8.

It can be seen that for any relay node, when receiving any blockchain message from a blockchain node connected to the relay node or from another relay node, the relay node can directly transmit the received blockchain message to a target blockchain node connected to the relay node if the relay node itself is a target relay node. For example, the relay 1 forwards the first blockchain message to the node 2. Regardless of whether the relay node is a target relay node, if the relay node determines that there is a target relay node different from the relay node itself, the relay node can transmit the received blockchain message to the target relay node, for the target relay node to forward the blockchain message to a connected target blockchain node. For example, the relay 1 forwards the first blockchain message to the relay 2, the relay 5, and the relay 6.

Taking the first relay node as an example, when the first relay node intends to forward the first blockchain message to a target relay node different from the first relay node, the first relay node can directly forward the first blockchain message to the target relay node. For example, the relay 1 can directly forward the first blockchain message to the relay 2, the relay 5, and the relay 6.

As described above, whether the first relay node is a primary node in a relay node set to which the first relay node belongs affects the manner in which the first relay node processes a received blockchain message. Therefore, when the previously described solution is further combined with the two-layer routing table design solution, the processing manner of the first relay node includes the following steps:

When the first relay node is a primary node in a relay node set to which the first relay node belongs and the first relay node receives, from a second relay node in another relay node set, a second blockchain message sent for the target blockchain node in the target blockchain node set, the first relay node needs to query the information about the blockchain node connected to the first relay node and the primary routing table, until all target relay nodes connected to the target blockchain node in the relay node set to which the first relay node belongs are determined, for the target relay nodes to transmit the second blockchain message to the target blockchain node. Still taking FIG. 7 as an example, assuming that the relay 5 is the first relay node, and the relay 5 is used as a primary node of the relay set 2. After receiving the blockchain message forwarded by the relay 2, the relay 5 needs to query information about a blockchain node connected to the relay 5 and a primary routing table. If the node 7 and the node 8 are target blockchain nodes, the relay 5 can determine that the relay 5 itself and the relay 6 are target relay nodes. Therefore, the relay 5 forwards the blockchain message to the node 7, and also forwards the blockchain message to the relay 6, for the relay 6 to forward the blockchain message to the node 8. In this scenario, because the relay 5 receives the blockchain message from another relay node set, the relay 5 only needs to be concerned about target relay nodes in the relay set 2 to which the relay 5 belongs, and does not need to be concerned about target relay nodes in other relay node sets. Therefore, a secondary routing table does not need to be queried. For other relay node sets, for example, when other relay node sets such as a relay set 3 and relay set 4 exist, if the relay node sets include target relay nodes, the relay 2 forwards the blockchain message to primary nodes in the relay node sets. This process is similar to the process in which the relay 2 forwards the blockchain message to the relay 5, so the details will not be described herein again.

When the first relay node is a secondary node in a relay node set to which the first relay node belongs and the first relay node receives, from a primary node in the relay node set to which the first relay node belongs, a third blockchain message sent for the target blockchain node in the target blockchain node set, the first relay node can determine a target blockchain node connected to the first relay node, and forwards the third blockchain message to the determined target blockchain node. Still taking FIG. 7 as an example, assuming that the relay 6 is the first relay node, and the relay 6 is a secondary node in the relay set 2. When the relay 5 serving as a primary node determines that the relay 6 is a target relay node, the relay 6 receives the blockchain message from the relay 5, and the relay 6 then determines whether there is a target blockchain node in the blockchain nodes connected to the relay 6. For example, the relay 6 can determine that the node 8 is a target blockchain node, and then the relay 6 can forward the received blockchain message to the node 8. The relay 6 does not need to be concerned about whether other relay nodes in the relay set 2 are target relay nodes, which is determined by the relay 5 serving as the primary node by querying the primary routing table. Therefore, the relay 6 does not need to query a primary routing table. Certainly, the relay 6 also does not need to be concerned about target relay nodes in other relay node sets, and thus also does not need to query a secondary routing table.

During querying, if the first relay node can determine whether all target relay nodes are found, for example, a total quantity of target blockchain nodes is marked in the first blockchain message, when a quantity of found target blockchain nodes reaches the total quantity, the first relay node can determine that the found blockchain nodes are all the target blockchain nodes, and corresponding relay nodes are all the target relay nodes. In this case, regardless of whether there are still routing policies having not been found, the first relay node does not need to continuously perform querying. Conversely, if a quantity of found target blockchain nodes is less than the total quantity, querying needs to be continuously performed. Therefore, the first relay node may only need to query the information about the blockchain node connected to the first relay node (even only need to query a part of information), and does not need to continuously query the primary routing table and the secondary routing table, or may only need to query the information about the blockchain node connected to the first relay node and the primary routing table (may only need to query a part of the primary routing table), and does not need to continuously query the secondary routing table, or may only need to query the information about the blockchain node connected to the first relay node, the primary routing table, and the secondary routing table (can only need to query a part of the secondary routing table).

The first relay node can further determine whether all the target relay nodes are found in another manner. For example, when a blockchain node generates a blockchain message, a type field in the blockchain message can be configured. When the type field is a first value, it indicates that a target field included in the blockchain message is a set identifier of a target blockchain node set. When the type field is a second value, it indicates that a target field included in the blockchain message is a node identifier of a target blockchain node. Because the blockchain node can be registered to or exit from the blockchain node set at any time, when reading that a value of the type field is the first value, the first relay node cannot determine information about the target blockchain node (such as a node identifier and a quantity of nodes), and all routing policies need to be traversed. When reading that a value of the type field is the second value, the first relay node can directly read a node identifier of each target blockchain node, and thus can determine information about the each target blockchain node (such as a node identifier and a quantity of nodes), and the information is used for determining whether all the target relay nodes are found in the querying process.

Step 306. Transmitting the blockchain message to the target blockchain node by using the target relay node.

After the first relay node determines the target relay node: if the first relay node is a target blockchain node, the first relay node transmits, according to a target blockchain node connected to the first relay node, the blockchain message to the target blockchain node; or if the first relay node is not a target blockchain node, or there is another target relay node except from the first relay node, the first relay node transmits the blockchain message to the target relay node, for the target relay node to forward the blockchain message to the connected target blockchain node. When the first relay node transmits the blockchain message to the target relay node, if the first relay node can be directly connected to the target relay node, the blockchain message can be directly transmitted to the target relay node. If the relay node is not directly connected to the target relay node, the first relay node can plan a transmission path between the first relay node and the target relay node and send the blockchain message to a relay node at next hop in the transmission path, for the blockchain message to reach the target relay node along the transmission path.

In conclusion, the technical solution of this specification can make the relay node in the blockchain relay communication network realize targeted message transmission in the process of transmitting the blockchain message, which aims to transmit the blockchain message to the target relay node and then transmit the blockchain message from the target relay node to the blockchain node serving as a target object, without generating unnecessary data exchange between the relay nodes or between the relay nodes and the blockchain nodes, thereby eliminating a blindness of message transmission based on the P2P technology in the related art, accelerating the transmission of the blockchain message, and reducing resource consumption of the blockchain relay communication network.

Figure 8:
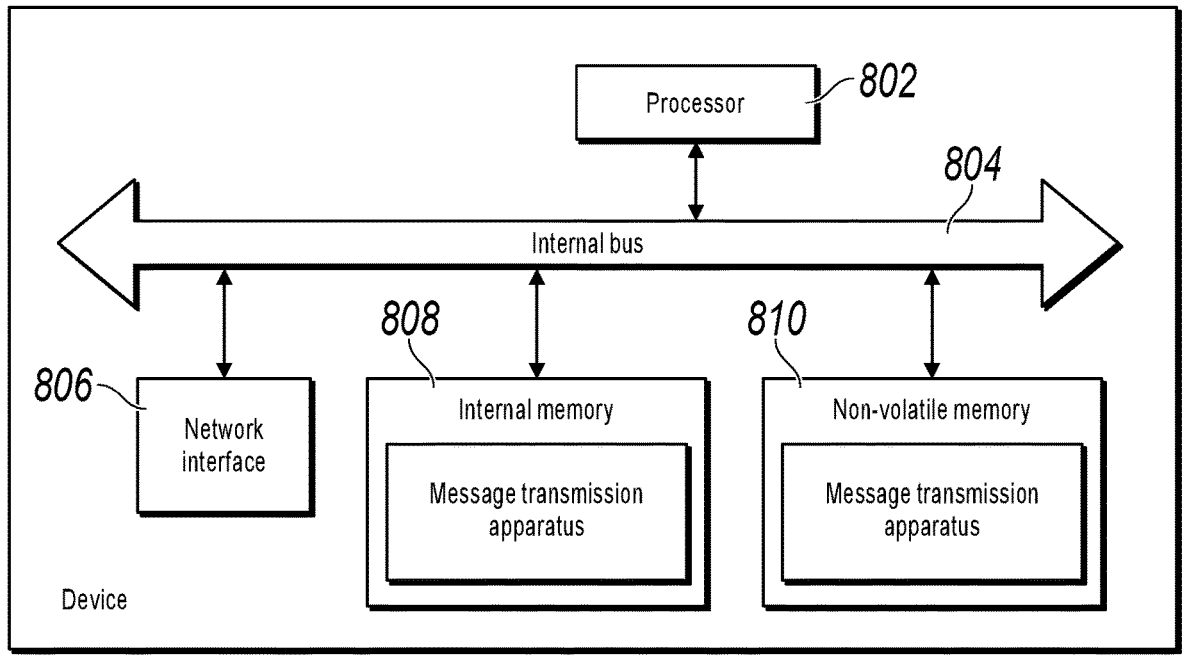
FIG. 8 is a schematic structural diagram of a device, according to an explanatory embodiment.

FIG. 8 is a schematic structural diagram of a device according to an explanatory embodiment. Referring to FIG. 8, at the hardware level, the device includes a processor 802, an internal bus 804, a network interface 806, an internal memory 808, and a non-volatile memory 810, and certainly can further include hardware needed for other services. The processor 802 reads a corresponding computer program from the non-volatile memory 810 into the internal memory 808 and then executes the computer program, to form a message transmission apparatus at a logic level. Certainly, besides a software implementation, one or more embodiments of this specification do not exclude other implementations, for example, logic devices or a software-hardware combination. That is, execution bodies of the following processing procedures are not limited to logic units and can alternatively be hardware or logic devices.

Figure 9:
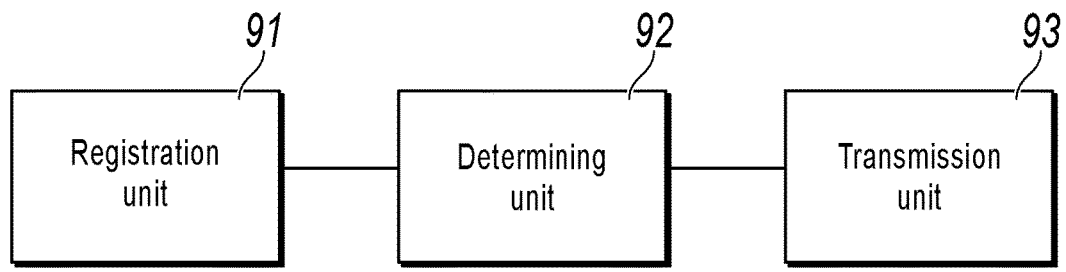
FIG. 9 is a block diagram of a message transmission apparatus, according to an explanatory embodiment.

Referring to FIG. 9, in a software implementation, the message transmission apparatus is applicable to a first relay node in a blockchain relay communication network, and can include:

a registration unit 91, configured to register, according to a registration request submitted by each blockchain node, the each blockchain node to a blockchain node set indicated in the registration request, to respectively generate a routing policy corresponding to the each blockchain node, the routing policy includes a blockchain node set to which the each blockchain node belongs and a relay node to which the each blockchain node is connected;

a determining unit 92, configured to determine, when receiving a blockchain message sent for a target blockchain node in a target blockchain node set, a target relay node connected to the target blockchain node in the blockchain relay communication network based on a tree-structured routing table, the tree-structured routing table is obtained by organizing the routing policies in a tree structure, the routing policies are corresponding to paths from a root node to leaf nodes in the tree structure respectively, a leaf node in each path representing a blockchain node corresponding to a corresponding routing policy, a value of the leaf node is information about a relay node connected to the corresponding blockchain node, and a non-leaf node representing a blockchain node set included in the corresponding routing policy; and a transmission unit 93, configured to transmit the blockchain message to the target blockchain node by using the target relay node.

Optionally, the registration unit 91 is specifically configured to:

register, in a case that the registration request includes a set identifier, the each blockchain node initiating the registration request to a blockchain node set corresponding to the set identifier; and register, in a case that the registration request does not include a set identifier, the each blockchain node initiating the registration request to a default blockchain node set.

Optionally, that the determining unit 92 receives a blockchain message sent for a target blockchain node in a target blockchain node set includes:

receiving the blockchain message from a connected blockchain node; or receiving the blockchain message from another relay node in the blockchain relay communication network.

Optionally, the determining unit 92 is specifically configured to:

sequentially query, when receiving the blockchain message from the connected blockchain node, information about a blockchain node connected to the first relay node and the tree-structured routing table, until all target relay nodes respectively connected to the target blockchain node are determined;

sequentially query, when the first relay node is a primary node in a relay node set to which the first relay node belongs, and the another relay node is a second relay node in another relay node set, information about a blockchain node connected to the first relay node and the tree-structured routing table, until all target relay nodes connected to the target blockchain node in the relay node set to which the first relay node belongs are determined; or query, when the first relay node is a secondary node in a relay node set to which the first relay node belongs, and the another relay node is a primary node in the relay node set to which the first relay node belongs, information about a blockchain node connected to the first relay node, to determine whether the first relay node is a target blockchain node.

Optionally, the tree-structured routing table includes a primary routing table and a secondary routing table, the primary routing table is configured for recording routing policies corresponding to blockchain nodes respectively connected to all relay nodes in the relay node set to which the first relay node belongs, and the secondary routing table is configured for recording routing policies corresponding to blockchain nodes respectively connected to all relay nodes in the blockchain relay communication network, or routing policies corresponding to blockchain nodes respectively connected to the remaining relay nodes, that are not added to the relay node set, in the blockchain relay communication network.

The determining unit 92 is specifically configured to:

sequentially query, when receiving the blockchain message from the connected blockchain node, the information about the blockchain node connected to the first relay node, the primary routing table, and the secondary routing table, until all target relay nodes respectively connected to the target blockchain node are determined;

sequentially query, when the first relay node is a primary node in a relay node set to which the first relay node belongs, and the another relay node is a second relay node in another relay node set, the information about the blockchain node connected to the first relay node and the primary routing table, until all target relay nodes connected to the target blockchain node in the relay node set to which the first relay node belongs are determined; or query, when the first relay node is a secondary node in a relay node set to which the first relay node belongs, and the another relay node is a primary node in the relay node set to which the first relay node belongs, the information about the blockchain node connected to the first relay node, to determine whether the first relay node is a target blockchain node.

Optionally, the determining unit 92 is specifically configured to:

read identifier information included in the blockchain message, the identifier information is a node identifier and/or a set identifier; and determine, according to the tree-structured routing table, a routing policy matching the identifier information, and use a relay node included in the determined routing policy as the target relay node, the node identifier includes an identifier of the blockchain node set to which the target blockchain node belongs and an identifier of the target blockchain node, and the set identifier is an identifier of the target blockchain node set.

Optionally, the registration request further includes role type information, the role type information is used for representing a role type corresponding to the corresponding blockchain node in the corresponding blockchain node set, and the role type information is added to the routing policy corresponding to the corresponding blockchain node; and the determining unit 92 is specifically configured to:

read identifier information and a target role type included in the blockchain message, the identifier information is a node identifier and/or a set identifier; and determine, according to the tree-structured routing table, a routing policy matching the identifier information and the target role type, and using a relay node included in the determined routing policy as the target relay node, the node identifier includes an identifier of the blockchain node set to which the target blockchain node belongs and an identifier of the target blockchain node, and the set identifier is an identifier of the target blockchain node set.

Optionally, the transmission unit 93 is specifically configured to:

transmit, when the first relay node is a target relay node, the blockchain message to a target blockchain node connected to the first relay node; and/or transmit, when there is a target relay node different from the first relay node, the blockchain message to the target relay node, for the target relay node to forward the blockchain message to a connected target blockchain node.

The registration unit 91 is configured to register, according to a registration request submitted by each blockchain node, the each blockchain node to a blockchain node set indicated in the registration request.

The determining unit 92 is configured to determine, when receiving a blockchain message sent for a target blockchain node set, a target blockchain node that is already registered to the target blockchain node set and a target relay node connected to the target blockchain node in the blockchain relay communication network.

The transmission unit 93 is configured to transmit the blockchain message to the target blockchain node by using the target relay node.

Optionally, the registration unit 91 is specifically configured to:

register, in a case that the registration request includes a set identifier, the each blockchain node initiating the registration request to a blockchain node set corresponding to the set identifier; and register, in a case that the registration request does not include a set identifier, the each blockchain node initiating the registration request to a default blockchain node set.

Optionally, the default blockchain node set includes all blockchain nodes in the blockchain network to which the blockchain node initiating the registration request belongs.

Optionally, the determining unit 92 is specifically configured to:

receive the blockchain message sent for the target blockchain node set from a connected blockchain node; or receive the blockchain message sent for the target blockchain node set from another relay node in the blockchain relay communication network.

Optionally, the determining unit 92 is specifically configured to:

read a set identifier from the blockchain message after receiving the blockchain message; and determine a blockchain node set corresponding to the set identifier as a target blockchain node set corresponding to the blockchain message.

Optionally, the apparatus further includes: a recording unit 94, configured to record, according to role type information included in the registration request, a role type corresponding to the each blockchain node in the blockchain node set to which the each blockchain node belongs.

The determining unit 92 is specifically configured to: read a target role type indicated in the blockchain message, and use a blockchain node that is already registered to the target blockchain node set and that corresponds to the target role type as the target blockchain node.

Optionally, the apparatus further includes: a generation unit 95, configured to generate a routing table configured for recording the blockchain node set to which the each blockchain node belongs and a connection relationship between the blockchain nodes and relay nodes.

The determining unit 92 is specifically configured to: determine, by querying the routing table, a target blockchain node that is already registered to the target blockchain node set and a target relay node connected to the target blockchain node in the blockchain relay communication network.

Optionally, the transmission unit 93 is specifically configured to:

transmit the blockchain message to a connected target blockchain node; and/or transmit the blockchain message to the target relay node, for the target relay node to forward the blockchain message to a connected target blockchain node.

Optionally, the transmission unit 93 is further configured to:

determine, when receiving a blockchain message sent for any blockchain node, a relay node connected to the any blockchain node in the blockchain relay communication network, and transmit the blockchain message to the any blockchain node by using the determined relay node.

The system, the apparatus, the module or the unit described in the previously described embodiments can be specifically implemented by a computer chip or an entity, or implemented by a product having a certain function. A typical implementation device is a computer. A form of the computer can be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (such as CPUs), one or more input/output interfaces, one or more network interfaces, and one or more memories.

The memory can include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which can implement storage of information by using any method or technology. The information can be computer-readable instructions, a data structure, a module of a program, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. According to limitations of this specification, the computer-readable medium does not include transitory computer-readable media, such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specified expressly, or can include inherent elements of the process, method, product, or device. Without further limitation, the element defined by a phrase "include a/an . . . " does not exclude other same elements in the process, method, article or device which include the element.

Embodiments of this specification are described above. Other embodiments fall within the scope of the appended claims. In some cases, the actions or steps recorded in the claims can be performed in sequences different from those in the embodiments and an expected result can still be achieved. In addition, the processes depicted in the accompanying drawings is not necessarily performed in the specific order or successively to achieve an expected result. In some implementations, multitasking and parallel processing can be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like can be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when," or "in response to determination."

The previously described descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:

registering each of a plurality of blockchain nodes in a blockchain relay communication network to a blockchain node set indicated in a registration request submitted by a corresponding blockchain node of the plurality of blockchain nodes;

generating a routing policy corresponding to each of the plurality of blockchain nodes, the routing policy comprising a blockchain node set that the corresponding blockchain node belongs and a relay node that connects to the corresponding blockchain node;

receiving a blockchain message for a target blockchain node in a target blockchain node set;

determining a target relay node connected to the target blockchain node according to a tree-structured routing table obtained by organizing routing policies in a tree structure, wherein the routing policies correspond to a plurality of paths from a root node to a plurality of leaf nodes in the tree structure, a leaf node in each of the plurality of paths represents a blockchain node corresponding to a routing policy of the routing policies, a value of the leaf node includes information about a relay node connected to the corresponding blockchain node, and a non-leaf node represents a blockchain node set included in the routing policy of the routing policies; and transmitting the blockchain message to the target blockchain node.

2. The method according to claim 1, wherein registering each of a plurality of blockchain nodes in a blockchain relay communication network to a blockchain node set indicated in the registration request comprises at least one of:

registering, when the registration request comprises a set identifier, each of the plurality of blockchain nodes initiating the registration request to a blockchain node set corresponding to the set identifier; or registering, when the registration request does not comprise a set identifier, each of the plurality of blockchain nodes initiating the registration request to a default blockchain node set.

3. The method according to claim 1, wherein receiving a blockchain message for a target blockchain node in a target blockchain node set comprises:

receiving the blockchain message from a connected blockchain node or another relay node in the blockchain relay communication network.

4. The method according to claim 3, wherein determining a target relay node connected to the target blockchain node in the blockchain relay communication network comprises one of:

querying, in response to receiving the blockchain message from the connected blockchain node, information about a blockchain node connected to a first relay node and the tree-structured routing table, before all target relay nodes respectively connected to the target blockchain node are determined;

querying, in response to a first relay node being a primary node in a relay node set to which the first relay node belongs, and the another relay node in the blockchain relay communication network being a second relay node in another relay node set, information about a blockchain node connected to the first relay node and the tree-structured routing table, before all target relay nodes connected to the target blockchain node in the relay node set to which the first relay node belongs are determined; or querying, in response to a first relay node being a secondary node in a relay node set to which the first relay node belongs, and the another relay node being a primary node in the relay node set to which the first relay node belongs, information about a blockchain node connected to the first relay node, to determine whether the first relay node is a target blockchain node.

5. The method according to claim 4, wherein the tree-structured routing table comprises a primary routing table and a secondary routing table, wherein the primary routing table is configured for recording routing policies corresponding to each of the plurality of blockchain nodes respectively connected to all relay nodes in the relay node set to which the first relay node belongs, and wherein the secondary routing table is configured for recording one of (i) routing policies corresponding to each of the plurality of blockchain nodes respectively connected to all relay nodes in the blockchain relay communication network, or (ii) routing policies corresponding to each of the plurality of blockchain nodes respectively connected to remaining relay nodes, that are not added to the relay node set, in the blockchain relay communication network.

6. The method according to claim 5, wherein determining the target relay node connected to the target blockchain node in the blockchain relay communication network comprises one of:

querying, in response to receiving the blockchain message from the connected blockchain node, the information about the blockchain node connected to the first relay node, the primary routing table, and the secondary routing table, before all target relay nodes respectively connected to the target blockchain node are determined;

querying, in response to the first relay node being a primary node in a relay node set to which the first relay node belongs, and the another relay node being a second relay node in another relay node set, the information about the blockchain node connected to the first relay node and the primary routing table, before all target relay nodes connected to the target blockchain node in the relay node set to which the first relay node belongs are determined; or querying, in response to the first relay node being a secondary node in a relay node set to which the first relay node belongs, and the another relay node being a primary node in the relay node set to which the first relay node belongs, the information about the blockchain node connected to the first relay node, to determine whether the first relay node is a target blockchain node.

7. The method according to claim 1, wherein determining the target relay node connected to the target blockchain node in the blockchain relay communication network comprises:

retrieving identifier information comprised in the blockchain message, wherein the identifier information includes one of a node identifier and a set identifier; and determining, according to the tree-structured routing table, a routing policy matching the identifier information, and using a relay node comprised in the determined routing policy matching the identifier information as the target relay node, wherein the node identifier includes an identifier of the blockchain node set to which the target blockchain node belongs and an identifier of the target blockchain node, and wherein the set identifier is an identifier of the target blockchain node set.

8. The method according to claim 1, wherein the registration request comprises role type information, wherein the role type information represents a role type corresponding to the blockchain node in the corresponding blockchain node set, and wherein the role type information is added to the routing policy corresponding to the blockchain node.

9. The method according to claim 8, wherein determining the target relay node connected to the target blockchain node in the blockchain relay communication network comprises:

retrieving identifier information and a target role type comprised in a blockchain message, the identifier information includes one of a node identifier and a set identifier; and determining, according to the tree-structured routing table, a routing policy matching the identifier information and the target role type, and using a relay node included in the routing policy matching the identifier information as the target relay node, wherein the node identifier includes an identifier of the blockchain node set to which the target blockchain node belongs and an identifier of the target blockchain node, and wherein the set identifier is an identifier of the target blockchain node set.

10. The method according to claim 1, wherein transmitting the blockchain message to the target blockchain node comprises at least one of:
transmitting, when a first relay node is a target relay node, the blockchain message to a target blockchain node connected to the first relay node; or
transmitting, when there is a target relay node different from the first relay node, the blockchain message to the target relay node, for the target relay node to forward the blockchain message to a connected target blockchain node.

11. A non-transitory, computer-readable medium storing one or more instructions executable by a computer system to perform operations comprising:
registering each of a plurality of blockchain nodes in a blockchain relay communication network to a blockchain node set indicated in a registration request submitted by a corresponding blockchain node of the plurality of blockchain nodes;
generating a routing policy corresponding to each of the plurality of blockchain nodes, the routing policy comprising a blockchain node set that the corresponding blockchain node belongs and a relay node that connects to the corresponding blockchain node;
receiving a blockchain message for a target blockchain node in a target blockchain node set;
determining a target relay node connected to the target blockchain node according to a tree-structured routing table obtained by organizing routing policies in a tree structure, wherein the routing policies correspond to a plurality of paths from a root node to a plurality of leaf nodes in the tree structure, a leaf node in each of the plurality of paths represents a blockchain node corresponding to a routing policy of the routing policies, a value of the leaf node includes information about a relay node connected to the corresponding blockchain node, and a non-leaf node represents a blockchain node set included in the routing policy of the routing policies; and
transmitting the blockchain message to the target blockchain node.

12. The non-transitory, computer-readable medium according to claim 11, wherein registering each of a plurality of blockchain nodes in a blockchain relay communication network to a blockchain node set indicated in the registration request comprises at least one of:
registering, when the registration request comprises a set identifier, each of the plurality of blockchain nodes initiating the registration request to a blockchain node set corresponding to the set identifier; or
registering, when the registration request does not comprise a set identifier, each of the plurality of blockchain nodes initiating the registration request to a default blockchain node set.

13. The non-transitory, computer-readable medium according to claim 11, wherein receiving a blockchain message sent for a target blockchain node in a target blockchain node set comprises:
receiving the blockchain message from a connected blockchain node or another relay node in the blockchain relay communication network.

14. The non-transitory, computer-readable medium according to claim 13, wherein determining a target relay node connected to the target blockchain node in the blockchain relay communication network comprises one of:
querying, in response to receiving the blockchain message from the connected blockchain node, information about a blockchain node connected to a first relay node and the tree-structured routing table, before all target relay nodes respectively connected to the target blockchain node are determined;
querying, in response to a first relay node being a primary node in a relay node set to which the first relay node belongs, and the another relay node in the blockchain relay communication network being a second relay node in another relay node set, information about a blockchain node connected to the first relay node and the tree-structured routing table, before all target relay nodes connected to the target blockchain node in the relay node set to which the first relay node belongs are determined; or
querying, in response to a first relay node being a secondary node in a relay node set to which the first relay node belongs, and the another relay node being a primary node in the relay node set to which the first relay node belongs, information about a blockchain node connected to the first relay node, to determine whether the first relay node is a target blockchain node.

15. The non-transitory, computer-readable medium according to claim 14, wherein the tree-structured routing table comprises a primary routing table and a secondary routing table, wherein the primary routing table is configured for recording routing policies corresponding to each of the plurality of blockchain nodes respectively connected to all relay nodes in the relay node set to which the first relay node belongs, and wherein the secondary routing table is configured for recording one of (i) routing policies corresponding to each of the plurality of blockchain nodes respectively connected to all relay nodes in the blockchain relay communication network, or (ii) routing policies corresponding to each of the plurality of blockchain nodes respectively connected to remaining relay nodes, that are not added to the relay node set, in the blockchain relay communication network.

16. The non-transitory, computer-readable medium according to claim 15, wherein determining the target relay node connected to the target blockchain node in the blockchain relay communication network comprises one of:
querying, in response to receiving the blockchain message from the connected blockchain node, the information about the blockchain node connected to the first relay node, the primary routing table, and the secondary routing table, before all target relay nodes respectively connected to the target blockchain node are determined;
querying, in response to the first relay node being a primary node in a relay node set to which the first relay node belongs, and the another relay node being a second relay node in another relay node set, the information about the blockchain node connected to the first relay node and the primary routing table, before all target relay nodes connected to the target blockchain node in the relay node set to which the first relay node belongs are determined; or
querying, in response to the first relay node being a secondary node in a relay node set to which the first relay node belongs, and the another relay node being a primary node in the relay node set to which the first relay node belongs, the information about the blockchain node connected to the first relay node, to determine whether the first relay node is a target blockchain node.

17. The non-transitory, computer-readable medium according to claim 11, wherein determining the target relay node connected to the target blockchain node in the blockchain relay communication network comprises:

retrieving identifier information comprised in the blockchain message, wherein the identifier information includes one of a node identifier and a set identifier; and determining, according to the tree-structured routing table, a routing policy matching the identifier information, and using a relay node comprised in the routing policy matching the identifier information as the target relay node, wherein the node identifier includes an identifier of the blockchain node set to which the target blockchain node belongs and an identifier of the target blockchain node, and wherein the set identifier is an identifier of the target blockchain node set.

18. The non-transitory, computer-readable medium according to claim 11, wherein the registration request comprises role type information, wherein the role type information represents a role type corresponding to the blockchain node in the corresponding blockchain node set, and wherein the role type information is added to the routing policy corresponding to the blockchain node.

19. The non-transitory, computer-readable medium according to claim 18, wherein determining the target relay node connected to the target blockchain node in the blockchain relay communication network comprises:

retrieving identifier information and a target role type comprised in a blockchain message, the identifier information includes one of a node identifier and a set identifier; and determining, according to the tree-structured routing table, a routing policy matching the identifier information and the target role type, and using a relay node included in the routing policy matching the identifier information as the target relay node, wherein the node identifier includes an identifier of the blockchain node set to which the target blockchain node belongs and an identifier of the target blockchain node, and wherein the set identifier is an identifier of the target blockchain node set.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

registering each of a plurality of blockchain nodes in a blockchain relay communication network to a blockchain node set indicated in a registration request submitted by a corresponding blockchain node of the plurality of blockchain nodes;

generating a routing policy corresponding to each of the plurality of blockchain nodes, the routing policy comprising a blockchain node set that the corresponding blockchain node belongs and a relay node that connects to the corresponding blockchain node;

receiving a blockchain message for a target blockchain node in a target blockchain node set;

determining a target relay node connected to the target blockchain node according to a tree-structured routing table obtained by organizing routing policies in a tree structure, wherein the routing policies correspond to a plurality of paths from a root node to a plurality of leaf nodes in the tree structure, a leaf node in each of the plurality of paths represents a blockchain node corresponding to a routing policy of the routing policies, a value of the leaf node includes information about a relay node connected to the corresponding blockchain node, and a non-leaf node represents a blockchain node set included in the routing policy of the routing policies; and transmitting the blockchain message to the target blockchain node.

* * * * *